Patented Aug. 14, 1923.

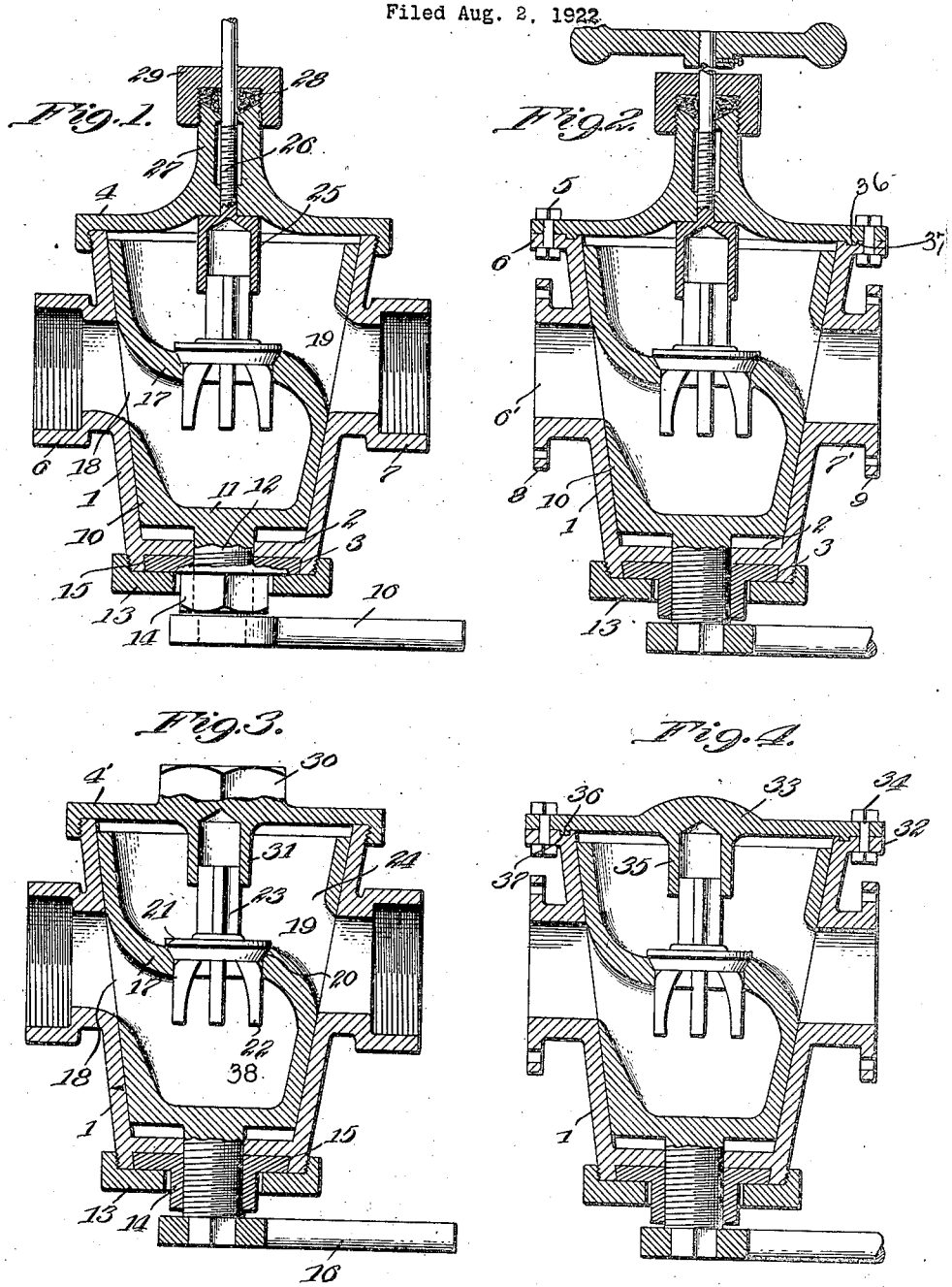

1,465,176

UNITED STATES PATENT OFFICE.

HARMON L. RAULERSON, OF OKEECHOBEE, FLORIDA, ASSIGNOR OF ONE-HALF TO STANLEY J. THIBODEAUX, OF OKEECHOBEE, FLORIDA.

VALVE.

Application filed August 2, 1922. Serial No. 579,229.

*To all whom it may concern:*

Be it known that I, HARMON L. RAULERSON, a citizen of the United States, residing at Okeechobee, in the county of Okeechobee and State of Florida, have invented new and useful Improvements in Valves, of which the following is a specification.

An object of this invention is to produce a combined check and stop valve for use between a pump or injector and a boiler in which the construction shall be strong, light and simple, and wherein the valve can be readily actuated under all conditions.

A further object is to produce a combined check and stop valve in which the core is in the nature of a hollow frusto-conical member having a division wall which provides a seat for the check valve, means on the valve casing guiding and adjusting the opening and closing of the valve, said means being also susceptible to adjustment for holding the valve seated, and further wherein the construction is such that it is impossible for the plug or core to blow out of the casing.

It is a still further and important object to produce a combined check and stop valve in which a hollow frusto-conical core is seated in a frusto-conical casing, said core having a central partition provided with an opening that forms a seat for the check valve and the casing having nipples disposed at the opposite sides of the partition, said casing having its top closed by a bonnet and provided with means for guiding the stem of the check valve, said means, if desired, being adjustable to regulate the opening and closing of the check or for holding the check seated, while the core is provided with a threaded stem projecting through the closed bottom of the casing, through a cap member secured to the bottom and through a nut or bushing which is arranged between the cap member and the bottom, the last mentioned member being designed for receiving the threaded extension so that the core may be readily loosened in the casing when it is desired to open or close the valve, with the result that danger of sticking between the core and casing is entirely overcome.

It is a still further object to produce a valve of this character in which safety in use is a chief characteristic, the construction and arrangement of parts being such as to positively prevent the core blowing through the top of the valve regardless of the pressure exerted thereagainst, inasmuch as the core is provided with an open top so that pressure of fluid passing through the check valve seat is exerted thereagainst and an excess of such pressure will have a tendency to seat, rather than unseat the core.

To the attainment of the foregoing objects, and many others which will present themselves as the nature of the invention is better understood, reference is to be had to the drawing which accompanies and which forms part of this application.

In the drawings:—

Figure 1 is a substantially central vertical longitudinal sectional view through a valve in accordance with this invention, the ports of the core or plug being in open position.

Figure 2 is a substantially similar sectional view, but illustrating the bonnet bolted to the casing and the nipples provided with apertured flanges for the reception of bolts that pass through similar flanges in the ends of the inlet and outlet fluid pipes.

Figure 3 is a substantially similar sectional view but illustrating a slight modification.

Figure 4 is a sectional view substantially similar to Figure 3, but showing the bonnet bolted to the casing and the nipples flanged and provided with apertures for the reception of bolts for securing the valve to the flanged ends of the inlet and outlet pipes.

My present invention is in substance, in the nature of an improvement upon the U. S. patent application of Stanley J. Thibodeaux and myself, which was filed by us September 4, 1920, bears the Serial No. 408,233, and was allowed April 6, 1922.

As in our application, I make use of a hollow conical body or casing 1 which is open at its widened end and which has its opposite or narrow end closed, as at 2. The bottom member 2 is, however, spaced a suitable distance inward from the end of the body of the casing, providing therebetween a pocket 3, for a purpose which will hereinafter be apparent.

In Figure 1 of the drawing, I have screwed on the open top of the body 1 a bonnet 4, while in Figure 2 the said bonnet is bolted, as at 5, to an extending flange 6 on the widened end of the body. Also in Figure 1 I have shown the body or casing 1 provided with approximately diametrically opposed openings surrounded by nipples 6 and 7, the said nipples being provided with interior threads, the nipple 6 receiving therein the threaded end of the intake pipe (not shown), while the threaded nipple 7 receives therein the threaded end of the outlet pipe (not shown). In Figure 2, however, the nipples 6' and 7' are provided with annular apertured flanges 8 and 9 respectively, and to these flanges there is bolted the flanged ends of the inlet and outlet pipes respectively. In other respects the construction is similar and the reference characters indicating the parts of one are to be understood as equally applicable to the other.

In each casing 1 there is an inverted hollow conical valve core 10. The core 10 is of a less length than the bore of the body or casing 1, the lower end of the core being closed, as at 11 and is provided with a reduced centrally arranged threaded stem 12 that passes through a central opening in the bottom 3 as well as through an opening in the cap plate 13 that is screwed or otherwise secured on the reduced end of the valve casing 1, below the bottom wall 2 thereof. Threadedly engaged by the stem 12 is a flanged nut 14, the flange 15 of the said nut being received in the pocket 3. The outer end of the stem is squared to receive therein a squared opening in the head of a removable operating handle 16.

The core or plug 10 is approximately centrally provided with a transverse partition 17, having its opposed walls rounded to its connection with the sides of the plug or core and the core is provided with ports to the opposite sides of the said partition one of which indicated by the numeral 18, designed to align with the bore of the nipple 6 or 6' and the other, indicated by the numeral 19 is designed to align with the bore of the nipple 7 or 7' when the core is turned to open position. The partition 17 is centrally formed with an inwardly flared opening that provides a seat 20 for a check valve 21. The check valve 21 has its under face provided with the usual legs 22 which serve as guides, the said legs being received in the inlet chamber 18 of the core or plug 10. The outer face of the check valve 21 is provided with a projecting stem 23 received in the upper chamber 24 of the core of plug 10 and being also received in the bore of a guide member 25 arranged on the end of a threaded stem 26 that passes through the central or hub portion 27 of the bonnet 4. The outer end of the hub is dished inwardly to receive therein a packing 28, and screwed on the said outer end there is a gland nut 29 that also contacts with the packing and in reality provides a box for the packing.

In Figures 3 and 4 of the drawing the construction, in the main, is the same as that previously described, and therefore the reference characters indicating parts in Figures 1 and 2 are to be understood as equally applicable to similar parts in Figures 3 and 4. The difference between the construction in Figure 3, and that disclosed in Figures 1 and 2 is that the bonnet 4' is centrally formed on its outer face with a nut 30 whereby the flanged bonnet may be screwed on the casing 1, and also that the bonnet 4' has its inner face integrally formed with a socket 31 that provides a guide for the stem 23 of the valve 21.

In Figure 4 the casing 1 has its widened open end flanged, as at 32 and the bonnet 33 is bolted, as at 34 to the flange. The bonnet 33 has its inner face centrally provided with a depending socket 35 that receives the stem 23 of the valve 21 therein.

Also in Figures 2 and 4, where the bonnet is bolted to the casing, the bonnet is provided with an annular rib 36 that is received in an annular groove 37 in the casing or body 1.

From the foregoing description, when taken in connection with the drawing, it will be seen that fluid entering the port 18 and the chamber 38 of the core or plug will unseat the valve 21. The valve is guided in such movement by the socket member 25. The steam, of course, then passes through the chamber 24 and finds an outlet through the port 19. It is to be noted that the top of the core is open so that an excess pressure will be received directly on the bonnet 4. The expansion of any excess pressure in the chamber 24 will have a tendency to force the hollow core downwardly into tight frictional engagement with the bore of the casing, such pressure likewise having a tendency to seat the valve 21. In no instance is it possible for an excess pressure in the chamber 38 to blow the core or plug out of the body or casing 1, there being, as previously inferred, practically no pressure against the open top of the plug. By adjusting the element 26 the socket member 25 may be regulated to adjust the opening and closing of the check valve, and by further adjusting said element the valve 21 may be held seated.

In turning the plug or core to bring the ports thereof into or out of alignment with the ports in the casing, the nut 14 is first turned on the stem 12. By reference to the drawing, it will be noted that the opening in the cap 13 is larger than the cross sectional diameter of the body of the nut 14 so that any leakage between the core and casing will find an outlet through this opening. Supposing the ports of the core to be out of alignment with the ports of the casing, the nut 14 is turned in an unscrewing direction which will force the core 10 in an outward direction with respect to the casing. This loosens the frictional engagement between the core and casing, the handle 16 is then employed for turning the core. When the core or plug is to close the ports of the casing, the nut is turned in an opposite direction, forcing the core downwardly in the casing and also into tight frictional engagement with the bore thereof. The handle 16 is then employed to turn the plug to bring its ports out of alignment with the ports of the casing. The tight frictional engagement between the core and casing, when the latter is in its last mentioned position, positively prevents leakage between these parts, and the longitudinal as well as the rotary motion imparted to the core prevents the accumulation of scale between these parts, so that free movement of the core is thus insured under all conditions.

It is believed that the foregoing description, when taken in connection with the drawing will fully set forth the construction, operation and advantages of the improvement to those skilled in the art to which this invention relates, but it is to be understood that I am not to be restricted to the illustrated embodiment herein set forth, and hold the invention to be limited only to the scope of the appended claim.

Having described the invention, I claim:—

A valve casing having a tapered central bore closed at its narrow end by an integral bottom partition spaced inwardly from the lower edge of the bore, a hollow tapered core engaged in the bore and presenting a threaded extension protruding through the said bottom partition, valve means within the core including inlet and outlet passages in line with corresponding passages in the valve casing, a cap plate detachably engaging the casing over the lower end of the said bore and presenting an enlarged opening through which the extension of the core is exposed, an adjusting nut having a flanged portion confined between the said cap plate and the said partition to provide a swivel bearing for the nut, said nut being threadedly engaged with the said extension of the core, and a handle engaged with the said extension beyond the said nut.

In testimony whereof I affix my signature.

HARMON L. RAULERSON.